Sept. 3, 1963   K. BEDROSIAN ET AL   3,102,777
APPARATUS AND METHOD OF PRESERVING ANIMAL AND PLANT MATERIALS
Filed Dec. 28, 1962
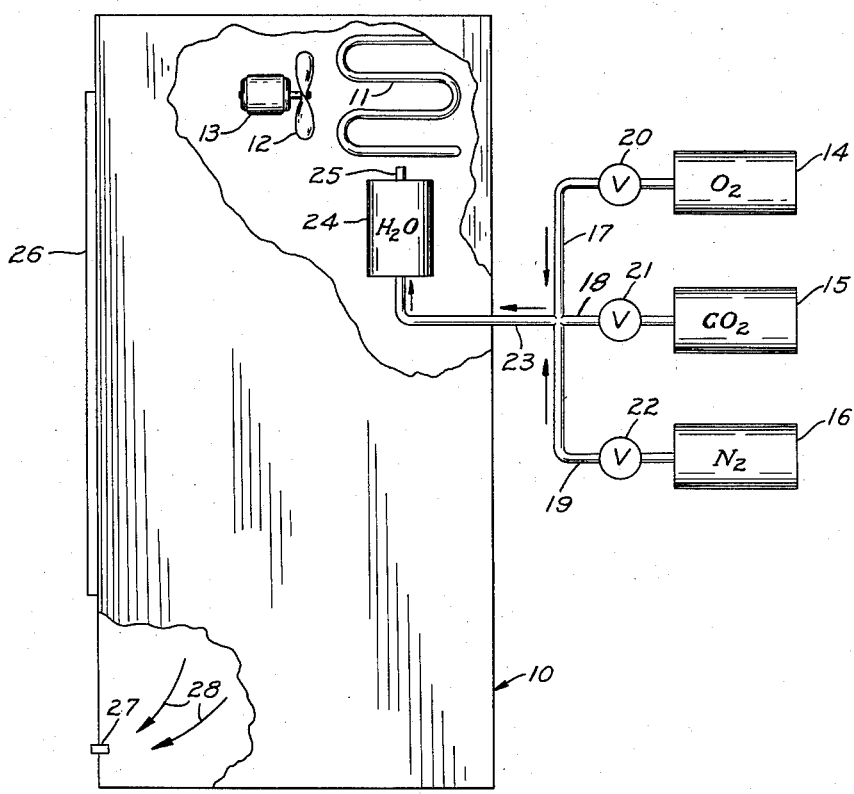
INVENTORS
KARAKIAN BEDROSIAN
AARON L. BRODY
BY
ATTORNEYS 3,102,777
APPARATUS AND METHOD OF PRESERVING
ANIMAL AND PLANT MATERIALS
Karakian Bedrosian, St. Joseph, Mich., and Aaron L. Brody, Morristown, N.J., assignors to Whirlpool Corporation, a corporation of Delaware
Filed Dec. 28, 1962, Ser. No. 248,158
8 Claims. (Cl. 21—53)

This invention relates to an apparatus and method of storing perishable animal and plant materials including both food materials and non-food materials.

This is a continuation-in-part application of our copending application Serial No. 49,863, filed August 16, 1960, now abandoned.

Stored animal and plant materials immediately begin to deteriorate because of combinations of various changes taking place in these materials. In general, these changes are brought about by the following actions: physiological, such as that brought about by enzymes, naturally occurring in all plant and animal materials; microbiological, caused principally by microorganisms such as bacteria, yeasts and molds which are natural contaminates of all plant and animal materials; biochemical, which is primarily caused by oxidation resulting in such end effects as rancidity and non-enzymatic browning; and physical, exemplified by dehydration and plasmolysis.

Physiological and microbiological degradation or deterioration which are the main causes of spoilage due to such degradation or deterioration in stored animal and plant materials are both dependent on respiratory activities. During this respiratory activity oxygen is assimilated from the surrounding atmosphere and carbon dioxide and water are produced as degradation products. As to whether the major or initial degradation will be a result of physiological or microbiological activity is a function of the nature of the raw material, the level and type of contamination, the maturity of the materials, and the storage temperature. Generally speaking, plant materials degrade physiologically prior to any significant microbiological changes whereas the opposite is true for animal materials.

The physiological degradation of stored plant materials which is also known as catabolism releases energy by consuming oxygen and releasing carbon dioxide and water. The microbiological degradation which is the major cause of degradation or deterioration in stored animal materials such as fresh meat and the like is caused largely by microorganisms. These also consume oxygen and produce carbon dioxide and water as with the plant materials. The degradation or deterioration process for both animal and plant materials can therefore be expressed in the following approximate respiratory change equation:

$$nO_2 + (CH_2O)_n \rightarrow nCO_2 + nH_2O$$

In this equation which expresses the chemical reactions involved, $(CH_2O)_n$ represents a carbohydrate molecule that is destroyed during the degradation or deterioration process as explained above with $n$ being a whole number dependent upon the size of the molecule, with the size of the molecule, of course, depending upon the number of recurring $CH_2O$ units present. The practical lower limit of $n$ is, of course, 6 and in this case the carbohydrate molecule would be that of a simple sugar. For more complex molecules $n$ could be extremely large such as 1,000,000 or more. However, in every instance one molecule of oxygen is consumed for each $CH_2O$ unit in the carbohydrate with the production of one molecule of carbon dioxide and one molecule of water. The carbohydrates are either present as such in the plant materials and microorganisms discussed above or may be produced as end products from other substances such as proteins and fats. In any event, the deterioration changes on storage of both animal and plant materials in the presence of oxygen such as the oxygen of normal air is expressed by the above chemical reaction equation.

The above formula is actually a simplified formula as the carbohydrate that is consumed ordinarily passes through a series of steps including a sugar stage, an acid stage and finally to the reaction products of carbon dioxide and water as indicated.

The method and apparatus of this invention results from the discovery that the progress of this equation can be retarded so as to slow down the aging process of stored plant and animal materials by, first, controlling the atmosphere to which the materials are subjected and, second continually replenishing this atmosphere during the storage period. It is virtually impossible as a practical matter to stop the progress of the reaction equation for the stored materials and stopping is not desired, as otherwise the stored materials would not respirate which is necessary to maintain their fresh characteristics. However, the storage period can be greatly extended to maintain the freshly stored appearance of the materials by slowing down the rate of the reaction.

In order to retard the progress of the above equation the storage atmosphere must contain reduced oxygen and increased carbon dioxide. As oxygen is being consumed in the above reaction the amount of oxygen is maintained at an amount less than that found in ordinary air. As carbon dioxide is being generated the amount of carbon dioxide in the storage atmosphere is greater than that normally found in air. Thus, on one hand the storage condition results in "starving" the carbohydrate so that its rate of deterioration is retarded. On the other hand, the carbohydrate is "flooded" with carbon dioxide so as to retard the reaction further. Thus, both the amount of oxygen and the amount of carbon dioxide serve to retard the rate of reaction and extend the storage life.

As is evident from the above explanation, the amounts of oxygen and carbon dioxide are not important so long as enough oxygen is present to permit the respiration progress of the equation but at a slower rate of respiration. If maximum storage life is desired, this amount of oxygen is only sufficient to maintain respiration of the stored materials. If only a very slight extension of the storage period is required, the amount of oxygen can be only slightly less than that found in normal air. As is well known, ambient or normal air customarily contains about 21% oxygen and about 0.03% carbon dioxide, both by volume, with the remainder of the air being nitrogen and minor amounts of other inert gases.

One of the features of this invention therefore is to provide an improved method of storing perishable animal and plant materials by subjecting them to a novel circulating controlled atmosphere that is continually replenished.

Another feature of the invention is to provide an improved apparatus for such storing of perishable animal and plant materials.

Other features and advantages of the invention will be apparent from the following description of one embodiment of an apparatus and several embodiments of methods for practicing the invention. The single FIGURE of the accompanying drawing illustrates an apparatus.

In the apparatus embodiment shown in the accompanying drawing there is a diagrammatic representation of a storage chamber 10 here shown as a refrigerator cooled by a refrigerant evaporator coil 11 over which air is circulated by means of a fan 12 driven by an electric motor 13. The fan 12 circulates air over the evaporator for chilling this air and also circulates the chilled air throughout the interior of the storage space within the refrigerator 10.

For those materials whose storage does not require refrigeration the apparatus will be much the same except that the refrigeration portion will be omitted.

Means are provided for controlling the atmosphere within the refrigerator 10. As disclosed, this means includes a pressure container 14 of oxygen, a second pressure container 15 of carbon dioxide and a third pressure container 16 of nitrogen. The containers 14, 15 and 16 are provided with outlet conduits 17, 18 and 19 respectively, all provided with flow regulating valves 20, 21 and 22, respectively.

The conduits 17, 18 and 19 all flow into a single conduit 23 which extends into the refrigerator and empties into the bottom of a container 24 of water. This container is provided with an exit conduit 25 at the top so that the mixed gases flowing into the container 24 from the conduit 23 are humidified by their passage upwardly through the water in the container 24 before they exit through the conduit 25. The water container 24 is within the refrigerator 10 and preferably adjacent the refrigerant evaporator 11 so that the water is maintained at about the same temperature as that maintained in the refrigerator. For those materials whose storage does not require high humidity the humidifying portions of the apparatus will of course be omitted.

The stored materials during the storage period may be maintained at a temperature that is either ambient or below or above ambient depending on many factors such as the length of the storage time, the type and source of materials being stored and the nature of the material itself. A practical but not excluding limit of temperature is about 29–120° F. Maintenance of the storage temperature may in certain instances require heating means in order to maintain even the minimum temperature if the surrounding ambient temperature should be too low. For storing plant and animal materials such as fresh foods, a storage temperature of about 29–55° F. is preferred.

The storage chamber 10 is provided with a normal access door also illustrated diagrammatically at 26 and means are provided for permitting the escape of gases so that the incoming gases through the conduit 23 serve to replenish substantially continually the controlled atmosphere within the chamber 10. These escape openings may be the usual leakages around sealing gaskets and through screw holes, bolt holes and other normal sources of leakage. In the illustrated embodiment these are illustrated diagrammatically by the passage 27 through which the atmosphere flows to the exterior as indicated by the arrows 28.

The storage atmosphere is one in which the amount of carbon dioxide as supplied from the container 15 is greater than that found in ordinary or ambient air and the amount of oxygen supplied from the container 14 is less than that found in ordinary or ambient air as explained earlier. An inert gas is provided with the oxygen and carbon dioxide to make up the remainder of the storage atmosphere. In the illustrated embodiment this gas is nitrogen supplied from the container 16.

By controlling the storage atmosphere in this manner the progress of the above equation to the right, which is an indication of the degradation of the products, is retarded. Tests have shown that both animal and plant materials can be stored for much longer periods of time under the conditions of this invention for an equal amount of degradation. Thus, the materials can be stored considerably longer in the controlled atmosphere of this invention than they can be stored in an ordinary atmosphere where the temperature conditions are the same as those employed in this invention.

In the preferred method of practicing the invention the amount of oxygen is maintained between approximately 1% and 10% by volume of the atmosphere and the amount of carbon dioxide is maintained from approximately 0.5 to 6 times the amount by volume of the oxygen with the remainder of the atmosphere being a gas such as nitrogen that is inert to the stored materials and which therefore has no measurable chemical effect on the materials. In most instances, the amount of carbon dioxide is preferably between about 1% and 15% by volume when the amount of oxygen is between about 1% and 10% by volume. For example, an atmosphere that has been found to be effective for most storage under the conditions of this invention is one containing 4% oxygen, 10% carbon dioxide, and 86% nitrogen. Some materials such as certain fruits may be better stored in an atmosphere containing 3% oxygen, 2% carbon dioxide and 95% inert gases, while other fruits may require a storage atmosphere of 1% oxygen, 5% carbon dioxide and 95% inert gases. Of course, it is most important that the atmosphere, regardless of its actual gas content, is vented from the storage space during the time the preserving atmosphere is being supplied, so that the incoming atmosphere substantially continually replenishes the atmosphere within the space and so that the atmosphere is not static.

The continual replenishing of the atmosphere within the storage space is necessary in order to remove respiration products as well as other products of aging. We have discovered that if these products resulting from the storage in the atmosphere of this invention are not removed damage to the stored material frequently occurs. Furthermore, by subjecting the stored material to optimum conditions which includes the continual replenishing of the storage atmosphere the appearance and quality of the stored materials may be maintained at desirable levels throughout the storage period. This continual replenishing may be achieved as indicated in the specific embodiment by venting the atmosphere from the storage chamber as fresh atmosphere is introduced.

Most animal and plant materials will be stored at 85–100% relative humidity. With some materials such as onions, grains and nuts the humidity may be lower such as that of ambient conditions. Thus the relative humidity may be as low as 25% or lower and as high as 100%.

Under storage conditions as explained herein and where the storage, for example, is in a household refrigerator the concentration of oxygen and carbon dioxide within the refrigerator would of course vary from time to time as the door 26 is opened and closed to insert and remove foods. In the normal household, tests have shown that the door is opened approximately 88 times during each 24 hour period. Each time the door is opened the percentage of oxygen increases as more oxygen is admitted from the ambient atmosphere while the amount of carbon dioxide decreases due to the escape of a portion of the storage atmosphere. However, these changes within the refrigerator apparently have no measurable effect on the storage life of animal and plant materials within the refrigerator when compared to a test condition when the door has remained closed for the entire storage life.

With the method and apparatus of this invention it has been found that many foods, for example, may be stored in a household refrigerator which is in constant use for four weeks and longer without serious degradation. In fact, berries such as strawberries and raspberries and the like have been stored for the full four week's term at 34° F. in an atmosphere initially of 4% oxygen, 10% carbon dioxide and 86% nitrogen in which the door was opened 88 times per 24 hour period without excessive loss of color, texture and taste in the berries.

Examples of animal and plant materials that may be stored for long periods of time under the conditions of this invention are non-food materials such as cut flowers, tobacco, flower bulbs and the like and foods such as apples, berries, peaches, pears, milk products including milk, butter and cheese, onions, celery, carrots, tomatoes, oranges, meat and meat products, eggs, potatoes, bananas, grapes, asparagus, beans, grains, nuts, peas and the like.

As is pointed out above, the storage atmosphere to which the stored materials are subjected contains less oxygen than found in normal air and increased carbon dioxide. In practicing this invention therefore it is not always necessary to add oxygen in a separate step particularly where the storage period is relatively short. In these instances the oxygen supply may be from the normal air in the storage space at the beginning of the storage period, or some may actually enter through the escape openings of the storage chamber. In these instances it is only necessary to supply carbon dioxide and an inert gas such as nitrogen to the room in such proportions that the amount of oxygen remaining in the room will be less than normal and the carbon dioxide greater than normal so as to retard the progress of the above aging deterioration equation.

Having described our invention as related to the embodiment set out herein, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus for storing for a storage period perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: means forming an enclosure having a storage space for said materials; means for supplying in said storage space during said period a storage atmosphere containing oxygen and carbon dioxide, the amount of oxygen being less than said normal air quantity to retard but not prevent the progress of said equation, and the amount of carbon dioxide being greater than said normal air quantity to retard but not prevent the progress of said equation; means for circulating said atmosphere in said space during said period; and means for substantially continually replenishing said atmosphere in said space by venting said atmosphere from said space and introducing fresh atmosphere to said space.

2. The apparatus of claim 1 wherein said amount of oxygen is about 1–10% by volume of said atmosphere and the amount of carbon dioxide is about 0.5–6 times the amount by volume of said oxygen.

3. Apparatus for storing for a storage period perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: means forming an enclosure having a storage space for said materials; means for supplying in said storage space during said period a storage atmosphere containing oxygen and carbon dioxide, the amount of oxygen being less than said normal air quantity to retard but not prevent the progress of said equation, and the amount of carbon dioxide being greater than said normal air quantity to retard but not prevent the progress of said equation; means for circulating said atmosphere in said space during said period; means for maintaining a relative humidity of about 25–100% in said storage space during said period; means for maintaining said materials at a temperature of about 29–120° F.; and means for substantially continually replenishing said atmosphere in said space by venting said atmosphere from said space and introducing fresh atmosphere to said space.

4. The apparatus of claim 3 wherein said amount of oxygen is about 1–10% by volume and the amount of carbon dioxide is about 1–15% by volume.

5. The apparatus of claim 3 wherein said temperature is about 29–55° F. and said relative humidity is about 85–100%.

6. The method of storing perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: subjecting said materials to an atmosphere containing oxygen and carbon dioxide, the amount of oxygen being less than said normal air quantity to retard but not prevent the progress of said equation, and the amount of carbon dioxide being greater than said normal air quantity to retard but not prevent the progress of said equation; and substantially continually replenishing said atmosphere by venting said atmosphere from said materials and introducing fresh atmosphere to said materials.

7. The method of claim 6 wherein said amount of oxygen is about 1–10% by volume of said atmosphere and the amount of carbon dioxide is about 0.5–6 times the amount by volume of said oxygen.

8. The method of storing perishable animal and plant materials subject to respiratory deterioration changes on storage in air containing normal quantities of oxygen and carbon dioxide wherein oxygen is consumed and carbon dioxide is produced according to the following approximate respiratory change equation:

$$nO_2 + (CH_2O)_n \rightarrow nCO_2 + nH_2O$$

wherein $(CH_2O)_n$ represents a carbohydrate molecule from said materials, comprising: subjecting said materials to an atmosphere about 25–100% relative humidity containing about 1–10% by volume of oxygen, about 1–15% by volume of carbon dioxide and the remainder inert gases while subjecting said materials to a temperature of about 29–120° F.; and substantially continually replenishing said atmosphere by venting said atmosphere from said materials and introducing fresh atmosphere to said materials.

References Cited in the file of this patent

UNITED STATES PATENTS

| | | |
|---|---|---|
| 1,259,410 | Kapadia | Mar. 12, 1918 |
| 1,511,306 | Slate | Oct. 14, 1924 |
| 1,798,781 | Brooks | Mar. 31, 1931 |
| 1,811,496 | Day | June 23, 1931 |
| 1,825,385 | Day | Sept. 29, 1931 |
| 1,829,951 | Walsh | Nov. 3, 1931 |
| 2,071,175 | Philipp | Feb. 16, 1937 |
| 2,095,780 | Willat | Oct. 12, 1937 |
| 2,309,007 | Parsons | Jan. 19, 1943 |
| 2,389,267 | Matthei | Nov. 20, 1945 |
| 2,483,064 | Reich | Sept. 27, 1949 |
| 2,663,165 | Simpson | Dec. 22, 1953 |
| 2,923,629 | Bonomi | Feb. 2, 1960 |
| 2,930,704 | Williams | Mar. 29, 1960 |
| 2,955,940 | Williams | Oct. 11, 1960 |